(12) United States Patent
Park et al.

(10) Patent No.: US 10,228,458 B2
(45) Date of Patent: Mar. 12, 2019

(54) METHOD AND APPARATUS FOR READING CODE USING SHORT-RANGE MILLIMETER WAVE (MMWAVE) RADAR

(71) Applicant: Samsung Electronics Co., Ltd., Suwon-si, Gyeonggi-do (KR)

(72) Inventors: Joo-Sung Park, Suwon-si (KR); Ki-Taek Bae, Hwaseong-si (KR); Dae-Hyun Kim, Seoul (KR); Seung-Ku Han, Suwon-si (KR); Tae-Sik Yang, Suwon-si (KR); Sang-Hyun Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 15/449,498

(22) Filed: Mar. 3, 2017

(65) Prior Publication Data
US 2017/0254898 A1 Sep. 7, 2017

(30) Foreign Application Priority Data
Mar. 3, 2016 (KR) .......................... 10-2016-0025455

(51) Int. Cl.
*G06K 7/10* (2006.01)
*G01S 13/58* (2006.01)
(Continued)

(52) U.S. Cl.
CPC ............ *G01S 13/89* (2013.01); *G01S 13/584* (2013.01); *G01S 13/753* (2013.01); *G01S 13/88* (2013.01);
(Continued)

(58) Field of Classification Search
CPC .......... G01S 7/34; G01S 7/489; G01S 7/4918; G01S 7/52033; G01S 7/529; G01S 13/75;
(Continued)

(56) References Cited

U.S. PATENT DOCUMENTS

| | | | |
|---|---|---|---|
| 5,081,459 A | 1/1992 | Guillerot et al. | |
| 5,959,568 A * | 9/1999 | Woolley ................ | G01S 5/0289 235/385 |

(Continued)

FOREIGN PATENT DOCUMENTS

| | | |
|---|---|---|
| EP | 0 429 335 B1 | 5/1991 |
| EP | 1 732 222 A2 | 12/2006 |

(Continued)

*Primary Examiner* — Peter M Bythrow
(74) *Attorney, Agent, or Firm* — Jefferson IP Law, LLP

(57) ABSTRACT

A code reading method and a radar system using a short-range millimeter wave (mmWave) radar are provided. The method includes transmitting a mmWave radar signal to a target object from a radar system and receiving a reflection wave signal reflected on the target object, extracting reflection signal strengths for a plurality of line codes constituting the target object from the reflection wave signal, compensating for the reflection signal strengths considering a difference in antenna gain between the plurality of line codes as per an antenna radiation pattern of the radar system, forming a radar image using the compensated reflection signal strengths, and reading a binary code from the radar image.

16 Claims, 9 Drawing Sheets
(4 of 9 Drawing Sheet(s) Filed in Color)

(51) Int. Cl.
*G01S 13/75* (2006.01)
*G01S 13/88* (2006.01)
*G01S 13/89* (2006.01)

(52) U.S. Cl.
CPC ........ *G01S 13/881* (2013.01); *G06K 7/10326* (2013.01)

(58) Field of Classification Search
CPC .... G01S 13/751; G06K 7/10; G06K 7/10009; G06K 7/10168; G06K 7/10217
See application file for complete search history.

(56) References Cited

U.S. PATENT DOCUMENTS

| | | | | |
|---|---|---|---|---|
| 6,122,329 | A * | 9/2000 | Zai | G01S 13/751 342/42 |
| 6,259,991 | B1 * | 7/2001 | Nysen | G01S 7/40 340/10.1 |
| 6,480,141 | B1 | 11/2002 | Toth et al. | |
| 6,529,154 | B1 * | 3/2003 | Schramm, Jr. | G01S 13/89 342/195 |
| 6,775,616 | B1 * | 8/2004 | Nysen | G01S 7/40 340/988 |
| 7,068,211 | B2 | 6/2006 | Oswald et al. | |
| 7,183,922 | B2 * | 2/2007 | Mendolia | G01S 5/04 340/572.1 |
| 7,227,493 | B2 | 6/2007 | Oswald et al. | |
| 7,782,251 | B2 | 8/2010 | Bishop et al. | |
| 9,130,651 | B2 | 9/2015 | Tabe | |
| 9,973,037 | B1 * | 5/2018 | Lilly | G01S 13/75 |
| 2001/0053179 | A1 | 12/2001 | Campbell et al. | |
| 2006/0001585 | A1 * | 1/2006 | Saito | G01S 3/14 343/754 |
| 2006/0071790 | A1 * | 4/2006 | Duron | G01S 13/75 340/572.1 |
| 2008/0211631 | A1 * | 9/2008 | Sakamoto | G01S 5/0205 340/10.1 |
| 2009/0201166 | A1 * | 8/2009 | Itagaki | G01S 13/751 340/686.1 |
| 2010/0026554 | A1 | 2/2010 | Longman et al. | |
| 2010/0134376 | A1 | 6/2010 | Margomenos et al. | |
| 2010/0214073 | A1 * | 8/2010 | Kasai | G01S 13/38 340/10.2 |
| 2012/0294340 | A1 | 11/2012 | Edmonson et al. | |
| 2013/0063282 | A1 | 3/2013 | Baldwin et al. | |
| 2014/0022059 | A1 * | 1/2014 | Horst | G06K 7/10009 340/10.3 |
| 2014/0253709 | A1 * | 9/2014 | Bresch | H04N 7/18 348/77 |
| 2015/0332075 | A1 * | 11/2015 | Burch | G06K 7/10821 345/156 |
| 2016/0066137 | A1 * | 3/2016 | Kulkarni | H04W 4/02 455/456.1 |
| 2016/0081662 | A1 * | 3/2016 | Denk | A61B 8/5207 600/437 |

FOREIGN PATENT DOCUMENTS

| EP | 1 160 974 B1 | 1/2008 |
|---|---|---|
| EP | 1 160 975 B1 | 5/2008 |

* cited by examiner

METHOD AND APPARATUS FOR READING CODE USING SHORT-RANGE MILLIMETER WAVE (MMWAVE) RADAR

CROSS-REFERENCE TO RELATED APPLICATION(S)

This application claims the benefit under 35 U.S.C. § 119(a) of a Korean patent application filed in the Korean Intellectual Property Office on Mar. 3, 2016 and assigned Serial number 10-2016-0025455, the entire disclosure of which is hereby incorporated by reference.

TECHNICAL FIELD

The present disclosure relates to methods and apparatuses for extracting images of conductive objects using millimeter wave (mmWave) radar.

BACKGROUND

Radar means technology that detects an object using electromagnetic (EM) scattering and the range, speed, and shape of the object. In other words, a radar transceiver detects reflection wave signals backscattered from an object and calculates a radar cross section (RCS) of the object based on the signal strength of the reflection wave signals. The RCS is a parameter indicating how big a target object is seen on a radar and varies depending on the dielectric constant, shape, angle, and frequency of the target object.

Typical EM radar imaging has been developed and used for purposes of distance measurement, targeting, and tracking. The size in which a radar is mounted may reach a few meters. Since several years ago, communication systems using millimeter waves (mmWave) with a frequency of 30 GHz or more and a wavelength of 1 cm or less have been researched, leading to the implementation of 1 cm or less-sized micro antennas. Such micro antennas happened to be equipped in a transceiver, allowing for implementations of tiny semiconductor chip-type radars and various applications using the same.

In developing an application technology using short-range mmWave radar, it is critical to compensate for the strength of reflection wave signals intended for calculating a RCS (hereinafter, simply "reflection signal strength"). More particularly, 1 m-long or less short-range radars may be subject to a distortion of reflection wave signals by the maximum-minimum distance difference between the radar and the target. A signal attenuation in a radar system is proportional to the power of four. Thus, a slight difference in the maximum-minimum difference may cause a significant distortion of a radar image within a short range. Such issue could be disregarded given the fact that radar systems according to the related art have mostly accounted for long-distance object detection because the maximum-minimum distance difference relative to the distance to the target is neglectably small. For example, when the distance between a radar and a target is a few tens of km, and the size of the object is several meters, the object would be seen like a dot when viewed from the radar. However, if a short-range radar, a few tens of cm away from a target object looks at a few centimeter size object, the difference in strength between signals reflected on the same surface of an object needs to be compensated due to the difference in strength between the earliest reflection signal coming from the object and the latest coming reflection signal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for implementing an application technology using a short-range radar system.

Another aspect of the present disclosure is to provide a method and an apparatus for compensating for reflection signal strengths in a millimeter wave (mmWave) radar system.

In accordance with an aspect of the present disclosure, a method and an apparatus for predicting and compensating for factors that affect the radar cross section (RCS) in a mmWave radar system are provided.

In accordance with another aspect of the present disclosure, a method and an apparatus for reducing a RCS distortion in a short-range radar system are provided.

In accordance with another aspect of the present disclosure, a method and an apparatus for reading a conductor code by synthesizing a radar image of the conductor code in a short-range radar system are provided.

In accordance with another aspect of the present disclosure, a method for reading a code using a short-range mmWave radar is provided. The method includes transmitting a mmWave radar signal to a target object from a radar system and receiving a reflection wave signal reflected on the target object, extracting reflection signal strengths for a plurality of line codes constituting the target object from the reflection wave signal, compensating for the reflection signal strengths considering a difference in antenna gain between the plurality of line codes as per an antenna radiation pattern of the radar system, forming a radar image using the compensated reflection signal strengths, and reading a binary code from the radar image.

In accordance with another aspect of the present disclosure, a radar system reading a code using a short-range mmWave radar is provided. The radar system includes a transceiver configured to transmit a mmWave radar signal to a target object and receiving a reflection wave signal reflected on the target object and a processor configured to extract reflection signal strengths for a plurality of line codes constituting the target object from the reflection wave signal, compensate for the reflection signal strengths considering a difference in antenna gain between the plurality of line codes as per an antenna radiation pattern of the radar system, form a radar image using the compensated reflection signal strengths, and read a binary code from the radar image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee. As the color drawings are being filed electronically via EFS-Web, only one set of the drawings is submitted.

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
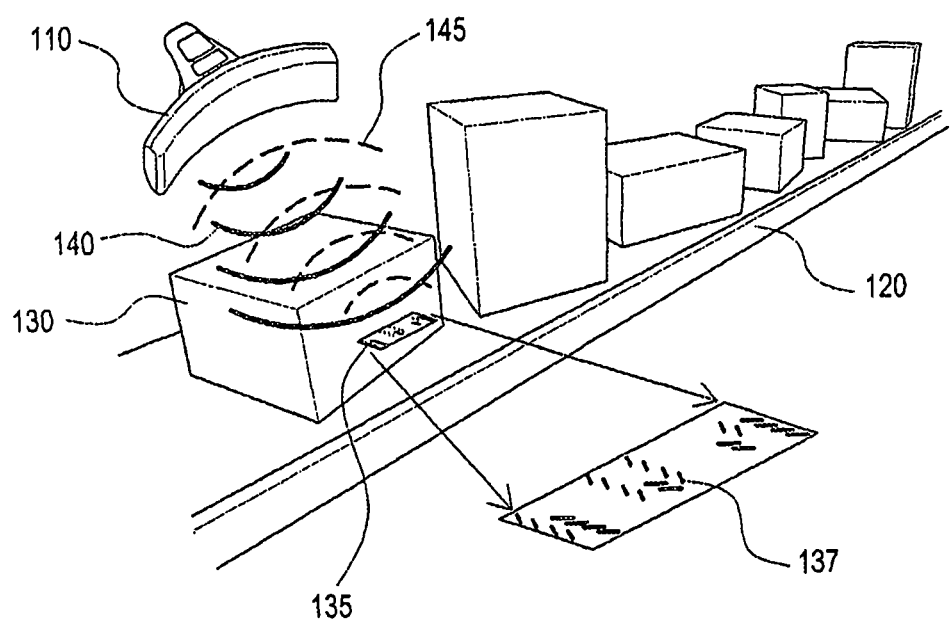
FIG. 1 is a view illustrating an application technology using a short-range millimeter wave (mmWave) radar according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

For the same reasons, some elements may be exaggerated or schematically shown. The size of each element does not necessarily reflect the real size of the element. The same reference numeral is used to refer to the same element throughout the drawings.

Advantages and features of the present disclosure, and methods for achieving the same may be understood through the various embodiments to be described below taken in conjunction with the accompanying drawings. However, the present disclosure is not limited to the various embodiments disclosed herein, and various changes may be made thereto. The various embodiments disclosed herein are provided only to inform one of ordinary skilled in the art of the category of the present disclosure. The present disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate a method for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operations are performed over the computer or other programmable data processing devices and operate the computer or other programmable data processing devices may provide operations for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element, such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more central processing units (CPUs) in a device or a security multimedia card.

Although the description of various embodiments herein primarily focuses on examples of a particular system, the subject matter of the present disclosure may also be applicable to other communication systems or services having similar technical backgrounds without departing from the scope of the present disclosure, and this may be determined by one of ordinary skill in the art.

Proposed is technology capable of synthesizing a radar image utilizing a single transceiver in order to apply a short-range millimeter wave (mmWave) radar to a chipless radio frequency identification (RFID) system according to various embodiments of the present disclosure.

According to an embodiment of the present disclosure, a short-range mmWave radar system may be used to identify a product box, which is a non-conductive wrapping material, under the circumstance where the product box is conveyed on a conveyor belt in a warehouse or manufacturing factory, with a tag for a chipless mmWave radar embedded therein or attached on the outside thereof. In order to secure a radar image of the box moving at a constant velocity or variable velocity, reflection signals may be measured at times when it is equi-angularly positioned with respect to the position of the radar system having a single transceiver. The following embodiments encompass technology capable of real-time detection of the optimal measurement time ensuring equiangularity.

FIG. 1 is a view illustrating an application technology using a short-range mmWave radar according to an embodiment of the present disclosure. An example chipless RFID is shown here which reads a barcode using a radar.

Referring to FIG. 1, a conveyor belt 120 may convey products at a predetermined velocity. A radar transceiver 110 with a single transceiver is positioned within a predetermined short distance from the moving line along which the products are conveyed on the conveyor belt 120. The radar transceiver 110 transmits a radar signal 140 to the conveyor belt 120, receives a reflection wave signal 145 reflected by the conductive ID tag 135 present inside the product 130, and reads the conductive ID tag 135 based on the reflection wave signal 145. The conductive ID tag 135 includes a barcode 137 recorded in a conductive ink. The radar transceiver 110 may form a radar image of the barcode 137 based on the reflection wave signal 145 and trace the product 130.

As such, the use of the short-range mmWave radar enables identification of the presence or absence of a product inside a box wrapped in the factory or the positioning of a particular book in a library. In other words, a low-cost, non-destructive chipless RFID system may be implemented which can extract a synthesis aperture radar (SAR) image using the nature of a radar signal that it can be transmitted through a wrapping material.

Figure 2:
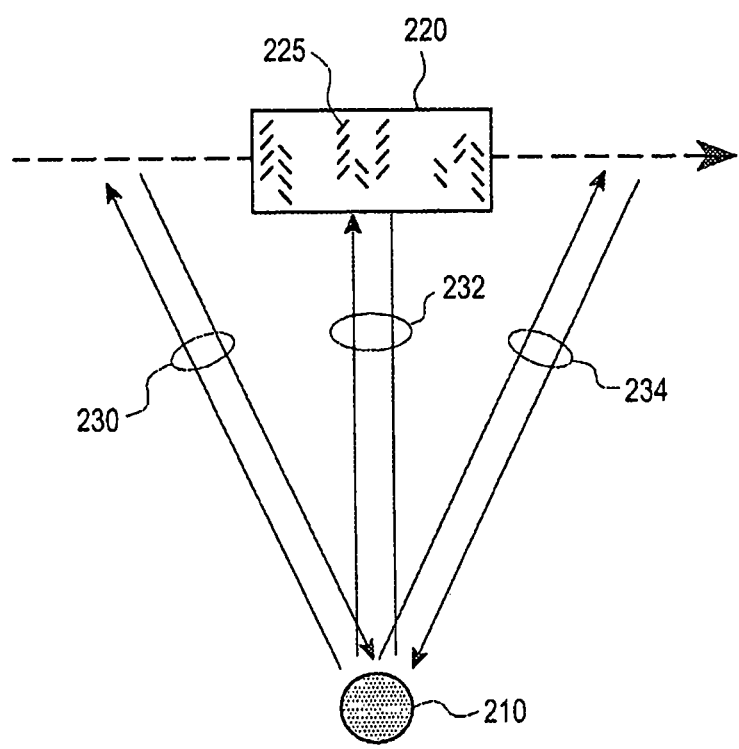
FIG. 2 is a view illustrating operations of a radar transceiver according to an embodiment of the present disclosure.

FIG. 2 is a view illustrating operations of a radar transceiver according to an embodiment of the present disclosure.

Referring to FIG. 2, a conductive ID tag 220 present inside a box on a conveyor belt moves at a predetermined velocity in a predetermined direction as the conveyor belt works. The conductive ID tag 220 becomes a target object that is intended to be detected by a radar transceiver 210. The radar transceiver 210 detects the moving conductive ID tag 220 at different positions while remaining at a fixed position. In the example shown, the radar transceiver 210 detects a first reflection wave signal 230 for the conductive ID tag 220 at a first position, a second reflection wave signal 232 for the conductive ID tag 220 at a second position, and a third reflection wave signal 234 for the conductive ID tag 220 at a third position. The conductive ID tag 220 includes a barcode 225, which is recorded in a conductive ink and operates as point scatters for a signal sent from the radar transceiver 210, and each reflection wave signal include reflection signals for the point scatters corresponding to lines in the barcode 225. The radar transceiver 210 then detects the positions of the lines constituting the barcode 225 based on the signal strengths and phases of the reflection signals included in the reflection wave signals.

Figure 3:
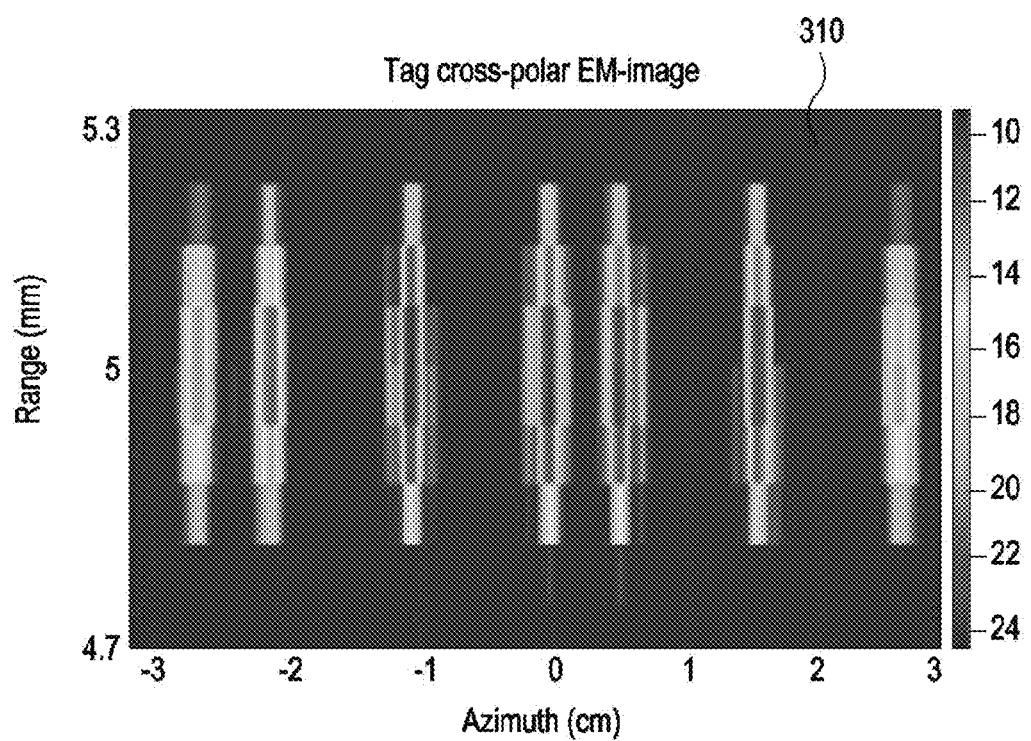
FIG. 3 is a view illustrating a tag cross polar electromagnetic (EM) image detected by a radar transceiver according to an embodiment of the present disclosure.

FIG. 3 is a view illustrating a tag cross-polar electromagnetic (EM) image detected by a radar transceiver according to an embodiment of the present disclosure. Here, the horizontal axis denotes the azimuth or cross-range, and the vertical axis denotes the range. Here, 'range' means the length in an axis direction of the line connecting the radar with the center of a target, and 'cross-range' means the length in a direction perpendicular to an axis of the range.

Referring to FIG. 3, an EM image 310 includes code images formatted corresponding to the lines of the barcode 225 in the conductive ID tag 220. Here, the horizontal axis means the width of the conductive ID tag 220 or cross-range, and the vertical-axis range means the length of the conductive ID tag 220. The code images include the signal strengths and phases of reflection wave signals detected at different line positions of the conductive ID tag 220. The radar transceiver 210, according to predetermined intervals (0.3 cm intervals in the example shown), may determine that the line position where a code image is detected is code 1, and the line position where no code image is detected is code 0.

Here, the code recognition rate may sharply be lowered due to the difference in reflection signal strength that stems from differences in distance (or also referred to as range) between the radar and the lines. In the following embodiments, thus, the reflection signal strengths are compensated given, e.g., the difference in distance between the radar and the target and antenna radiation patterns which are a cause for a RCS distortion in the short-range radar system.

A radar image of a target object may be formed based on RCSs calculate based on multiple reflection wave signals reflected on the target object. Here, the radar transceiver may determine times of scanning the reflection wave signals in order to measure the reflection wave signals equiangularly with respect to the radar transceiver. According to an embodiment of the present disclosure, where a target object for detection is on the move along a predetermined moving line, such as a factory conveyor belt does, different methods for determining the time of scanning the target object may be set depending on the moving velocity of the conveyor belt.

In order to synthesize a radar image of a conductive ID tag embedded (or attached onto the outside of) a box moving along a predetermined moving line, a mmWave radar system having a single transceiver may be operated in the following sequence to measure equiangular reflection wave signals with respect to the radar system.

The minimum distance r between the radar system and the moving line is previously known to the radar system upon placing the radar system and the conveyor belt.

At some time $t_0$ (initial measurement time), the radar system, after transmitting a radar signal, receives a reflection wave signal. The distance $d_0$ from the target object and the moving velocity $v_0$ on the moving line are obtained based on the received reflection wave signal. In this case, the moving velocity $v_0$ on the moving line may be obtained from an actually measured velocity $v_0^{raw}$ on the line of transmission and reception by the radar, as follows:

$$v_0 = \frac{d_0}{\sqrt{d_0^2 - r^2}} v_0^{raw} \qquad \text{Equation 1}$$

When the number of times of measurement required to synthesize a radar image of the target object is 2n+1, measurement times when reflection wave signals for the target object are to be scanned may be obtained in the following order based on results obtained at the initial measurement time.

When the distance between positions on the moving line at measurement time $t_k$ is defined with respect to the position closest to the radar system, the distance is calculated as in Equation 2 below:

$$l_k = r \cdot \tan\left(\frac{|n-k|}{n}\cos^{-1}\left(\frac{r}{d_0}\right)\right), \quad k = 0, 1, 2, 3, \cdots, 2n \qquad \text{Equation 2}$$

Measurement times $t_k$ after the initial measurement time may be calculated as in Equation 3 below:

$$t_k = \frac{|l_k - l_{k-1}|}{v} + t_{k-1}, \quad k = 1, 2, 3, \cdots, 2n \qquad \text{Equation 3}$$

Here, v means the constant moving velocity of the target object on the moving line, which is determined to be a velocity ($v_0$) measured for the target object at the initial measurement time. r is the minimum distance between the radar system and the target object, which is a value previously known to the radar system upon placing the radar transceiver. $d_0$ means the distance between the radar system and the target object which is measured for the target object at the initial measurement time.

Figure 4:
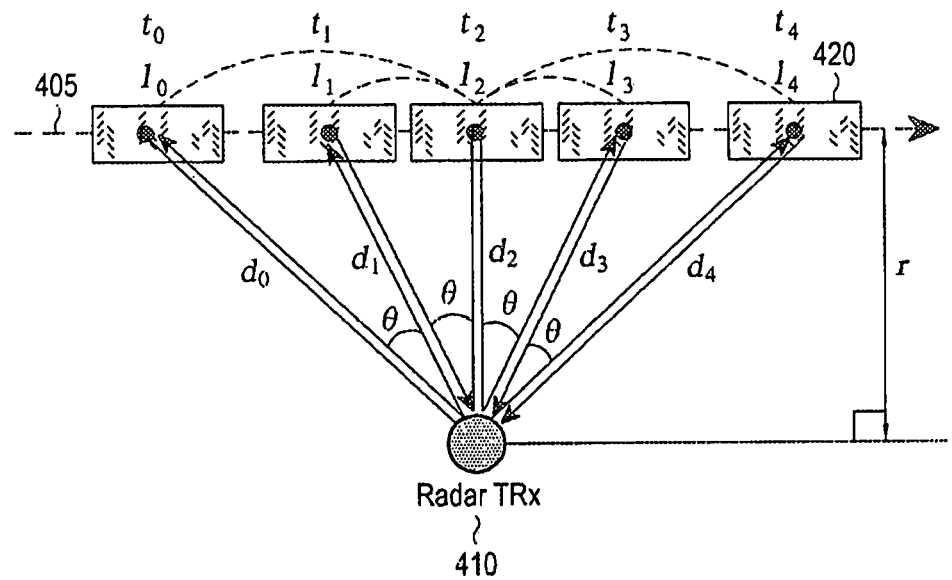
FIG. 4 is a view illustrating an operation of determining a scan time of a target moving at a constant velocity in a radar system according to an embodiment of the present disclosure.

FIG. 4 is a view illustrating an operation of determining a scan time of a target moving at a constant velocity in a radar system according to an embodiment of the present disclosure.

Referring to FIG. 4, a radar transceiver 410 has a fixed position, and a target object 420 is moving at a constant velocity along a predetermined moving line of a conveyor belt 405. When 2n times of measurement are required to generate a radar image for the target object 420 after a time $t_0$ when the target object 420 is first scanned—i.e., the initial measurement time, each time of measurement may be calculated as in Equation 3 above. Here, n is a positive integer which may previously be determined by the system operator or designer.

As per Equation 3 above and using a predetermined value, n, the initial measurement time, distance, and velocity, 2n scan times $t_1, t_2, t_3, t_4, t_5, \ldots, t_{2n}$ are sequentially calculated in real-time. The radar transceiver 410 may repeat the operations of transmitting radar signals to the target object 420 at the scan times, respectively, and receiving reflection wave signals corresponding to the sent-out signals and may thus gather the distance $d_k$ from the target object 420, velocity $v_k$ (k=1,2,3, . . . , 2n) at each scan time and reflection signal strengths, while remaining equiangular.

Figure 5:
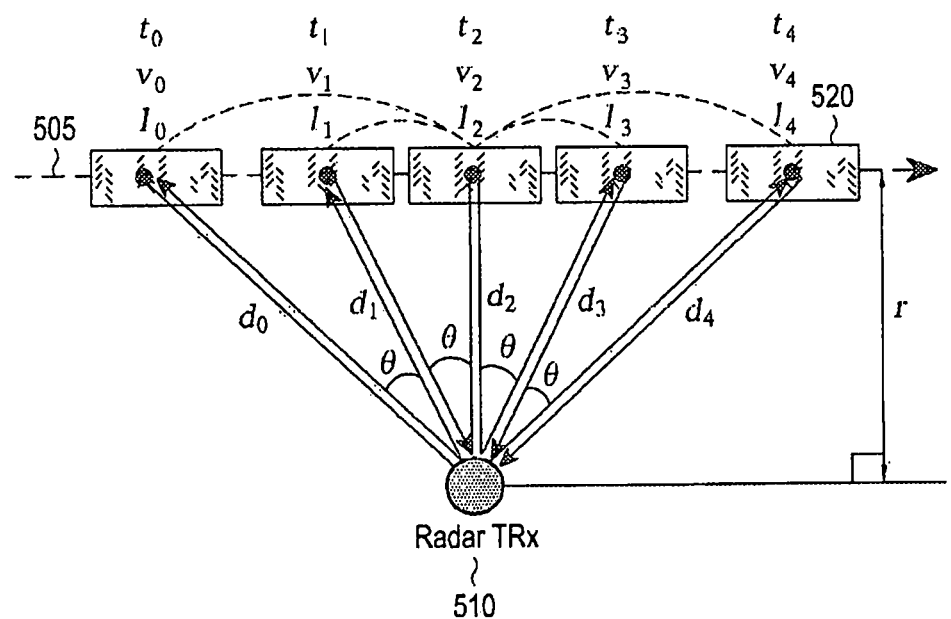
FIG. 5 is a view illustrating an operation of determining a scan time of a target moving at a variable velocity in a radar system according to an embodiment of the present disclosure.

FIG. 5 is a view illustrating an operation of determining a scan time of a target moving at a variable velocity in a radar system according to an embodiment of the present disclosure.

Referring to FIG. 5, a radar transceiver 510 has a fixed position, and a target object 520 is moving along a predetermined moving line of a conveyor belt 505. The velocity of the target object 520 may be varied.

When some time $t_0$ is a time when the target object 520 is first scanned—i.e., the initial radar measurement time— and 2n times of measurement are required to generate a radar image for the target object 520, each time of measurement may be calculated as in Equation 2 above. Here, n is a positive integer which may previously be determined by the system operator or designer.

$$t_k = \frac{|l_k - l_{k-1}|}{v_{k-1} + (v_{k-1} - v_{k-2})/2} + t_{k-1}, \quad k = 1, 2, 3, \cdots, 2n \qquad \text{Equation 4}$$

Here, $v_{k-1}$ means the moving speed of the target object 520 as measured at scan time $t_{k-1}$, and $v_0$ is determined to be a velocity measured for the target object 520 at the initial radar measurement time. r is the minimum distance between the radar transceiver 510 and the target object 520, which is a value previously known to the radar transceiver 410 upon placing the radar transceiver 510 and the conveyor belt 505. $d_0$ means the distance between the radar transceiver 510 and the target object 520 which is measured for the target object 520 at the initial radar measurement time.

As per Equation 4 above and using a predetermined value, n, the initial measurement time, distance, and velocity, 2n scan times $t_1$, t2, t3, t4, $t_5$, . . . , t2n are sequentially calculated in real-time. The radar transceiver 510 may repeat the operations of transmitting radar signals to the target object 520 at the scan times, respectively, and receiving reflection wave signals corresponding to the sent-out signals and may thus gather the distance $d_k$ from the target object 520, velocity $v_k$ (k=1,2,3, . . . , 2n) at each scan time and reflection signal strengths, while remaining equiangular.

Figure 6:
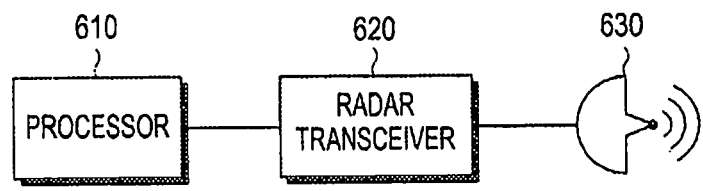
FIG. 6 is a block diagram illustrating a brief structure of a radar system according to an embodiment of the present disclosure.

FIG. 6 is a block diagram illustrating a brief structure of a radar system according to an embodiment of the present disclosure.

Referring to FIG. 6, a radar system includes a radar transceiver 620 that transmits radar signals through an antenna 630 and receives reflection wave signals corresponding to the sent-out signals and a processor 610 that reads a target object according to a result of detecting the reflection wave signals by the radar transceiver 620. The processor 610 may calculate reflection signal strengths according to the result of detecting the reflection wave signals, compensate for the reflection signal strengths, and form code images as per the compensated reflection signal strengths, according to an embodiment of the present disclosure.

Figure 7:
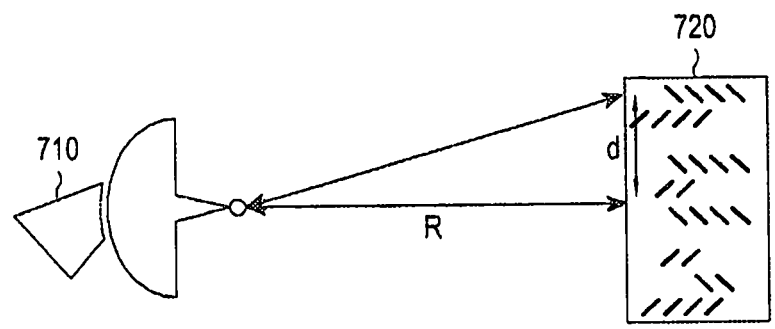
FIG. 7 is a view illustrating differences in reflection signal strength due to distances between a shrunken running screen and a target object according to an embodiment of the present disclosure.

FIG. 7 is a view illustrating differences in reflection signal strength due to distances between a shrunken running screen and a target object according to an embodiment of the present disclosure.

Referring to FIG. 7, a radar transceiver 710 transmits radar signals to a target object 720, e.g., a conductive ID tag, receives reflection wave signals scattered by the target object 720, and measures reflection signal strengths for the target object 720 based on the reflection wave signals. The minimum distance between the radar transceiver 710 and the target object 720 is $R^R$, and the maximum distance therebetween is $\sqrt{R^2+d^2}$. Here, d is ½ of the width of the target object 720. As an example, d may be previously known to the radar transceiver 710 by, e.g., the specifications of the conductive ID tag or may be actually measured upon synthesize of an initial radar image.

Among a plurality of line codes constituting the conductive ID tag of the target object 720, line codes more distant from the center thereof present smaller reflection signal strengths than those of line codes closer to the center because of being further away from the short-range radar transceiver 710, although they are of the same length. Hence, the reflection signal strength measured for an $i^{th}$ line code from the center of the plurality of line codes constituting the conductive ID tag may be compensated as in Equation 5 below depending on the difference in distance between the center of the target object 720 and the $i^{th}$ line code.

$$\tilde{A}(d_i) = A(d_i)\left(\frac{\sqrt{(R^2 + d_i^2)}}{R}\right)^4 \qquad \text{Equation 5}$$

Here, $A(d_i)$ means the reflection signal strength measured for the $i^{th}$ line code of the target object 720 by the radar transceiver 710, and $d_i$ means the distance between the central point and the $i^{th}$ line code.

Figure 8:
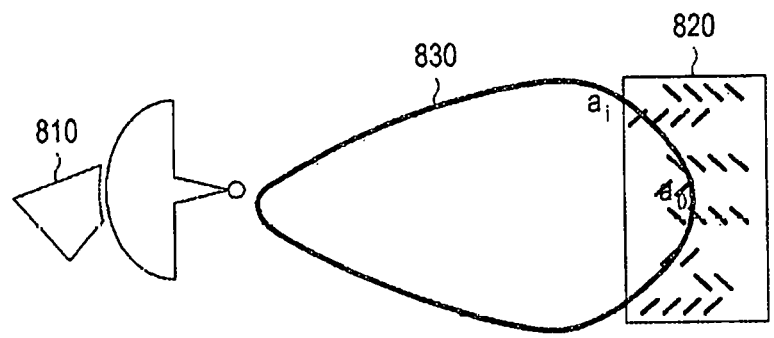
FIG. 8 is a view illustrating differences in reflection signal strength due to antenna radiation patterns in a shrunken running screen according to an embodiment of the present disclosure.

FIG. 8 is a view illustrating differences in reflection signal strength due to antenna radiation patterns in a shrunken running screen according to an embodiment of the present disclosure.

Referring to FIG. 8, a radar transceiver 810 forms a lobe 830 representing an antenna radiation pattern towards a target object 820, e.g., a conductive ID tag. The antenna gain for the line code positioned at the center of the target object 820 is $a_0$, and the antenna gain for the $i^{th}$ line code from the center is $a_i$. By the nature of the antenna radiation pattern 830, line codes more distant from the center of the plurality of line codes constituting the conductive ID tag exhibit smaller antenna gains than those of line codes closer to the center. Such a difference in antenna gain increases as the object widens relative to the distance from the target object 820. Accordingly, the reflection signal strength measured for the $i^{th}$ line code of the target object 820 according to the difference in antenna gain may be compensated as in Equation 6 below:

$$\tilde{A}(d_i) = A(d_i)\frac{a_0}{a_i} \qquad \text{Equation 6}$$

The antenna radiation pattern 830, as a value given upon designing the antenna, is previously known to the radar transceiver 810.

Since the difference in reflection signal strength due to distance and the difference in reflection signal strength due to antenna radiation pattern arise independently from each other, the compensation for a reflection signal strength may be achieved as in Equation 7 below, when both the factors are taken into consideration.

$$\tilde{A}(d_i) = A(d_i)\left(\frac{\sqrt{(R^2 + d_i^2)}}{R}\right)^4 \frac{a_0}{a_i} \qquad \text{Equation 7}$$

Figure 9:
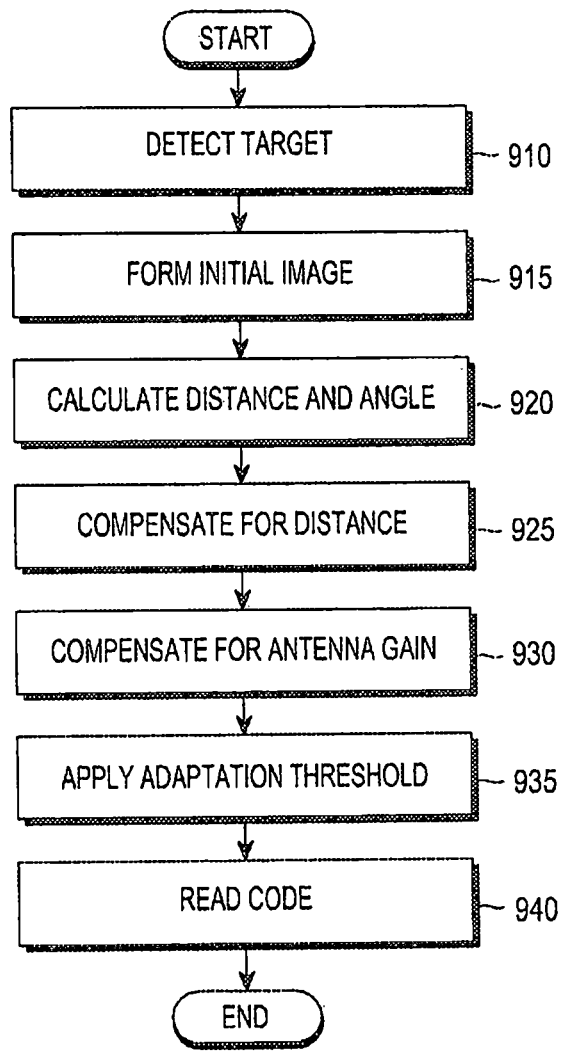
FIG. 9 is a flowchart illustrating a code reading procedure using a short-range mmWave radar system according to an embodiment of the present disclosure.

FIG. 9 is a flowchart illustrating a code reading procedure using a short-range mmWave radar system according to an embodiment of the present disclosure.

Referring to FIG. 9, a radar system transmits radar signals to a target object and receives reflection wave signals corresponding to the sent-out signals to detect the target object in operation 910. Here, the target object may be, e.g., a conductive ID tag present inside a box or attached to the outside of the box. The conductive ID tag may include a barcode recorded in a conductive ink. The box with the target object attached thereto is on the move, e.g., on a conveyor belt.

According to an embodiment of the present disclosure, before receiving the reflection wave signals, e.g., where a reflection wave signal corresponding to the target object is first received, the radar system may designate, as an initial measurement time, the time when the radar signal corresponding to the reflection wave signal was sent out and calculate in real-time measurement times when to scan the reflection wave signals for the target object based on the distance and velocity detected for the target object at the initial measurement time. By way of example, the measurement times may be calculated as per Equation 3 or 4 above.

Information about whether the target object moves at a constant velocity or variable velocity may be previously known to the radar system upon installation of a mover (e.g., the conveyor belt) of the target object or by the system designer or system operator, or may be determined directly by the radar system performing measurement on the target object at least three or more times.

In operation 915, the radar system extracts reflection signal strengths for the plurality of line codes constituting the target object based on the reflection wave signals detected at the plurality of measurement times. Here, where a radar image for the target object is formed by conducting SAR processing using the extracted reflection signal strengths as they are, the code recognition rate may sharply be lowered due to the difference in reflection signal strength between the line codes. To address such issue, a compensation procedure, such as at least one of operations 920 to 935 described below, may be carried out. Operations 920 and 935 described below may be selectively or integrally applied depending on the system designer's or operator's choice.

In operation 920, the radar system may calculate an angle on the antenna radiation pattern using the distance R between the radar system and the target object and the distance $d_i$ between the center of the conductive ID tag and the $i^{th}$ line code from the formed radar image. In operation 925, the radar system may compensate for reflection signal strengths of the reflection wave signals measured for each line code of the target object based on the distances. As an example, the reflection signal strength compensation, operation 925, may be fulfilled as per Equation 5 above.

In operation 930, the radar system may perform compensation, as per the antenna radiation pattern, on the reflection signal strengths measured for each line code or the reflection signal strengths compensated in operation 925. Here, the antenna radiation pattern is information that may be known in advance by measurement when the radar system is built up. For compensation as per the antenna radiation pattern, the radar system first calculates the angle for each line code from the distance between the radar system and the target object detected in operation 910, determines an antenna gain on the antenna radiation pattern for each line code based on the calculated angle, and compensates for the reflection signal strengths for each line code based on the antenna gain. As an example, the reflection signal strength compensation, operation 930, may be fulfilled as per Equation 6 above.

Since the compensation operations 925 and 930 are independent of each other, the compensation operation 925 as per distance and the compensation operation 930 as per antenna radiation pattern may simultaneously be performed using Equation 7.

A radar image of the target object, which is formed based on the reflection signal strengths compensated via operation 925 and/or operation 930, may have a uniform radar cross section (RCS) per line code.

Operation 935 may reduce errors in reading codes for the RCSs of the line codes through a threshold adaptation procedure. In an embodiment, the adaptation procedure may be performed as follows.

Each pixel value of a radar image formed based on gathered reflection wave signals is calculated by accruing the power strengths of the reflection wave signals corresponding to a relevant point in the target object for a plurality of measurement times. Where the distribution of the power strengths is large, invalid values need to be removed from the power strengths of the pixels. To that end, there is a need for the process of forcing pixels having power strengths less than a threshold into zero to reinforce the accuracy of the radar image. In this case, the warehouse or manufacturing factory, which is under real-time operation, needs to have a threshold that adaptively responds each time for various wrapping boxes.

In operation 935, the radar system may calculate an adaptive threshold as in Equation 8 below depending on the distribution of power strengths in the adaptation procedure.

$$Th = P_{max} - \alpha \times E\{|P - E\{P\}|^2\} \quad \text{Equation 8}$$

Here, P, as a random variable, includes values constituted depending on a probability distribution based on reflection signal strengths corresponding to the pixels of the radar image. The values constituting the random variable, P, are ones obtained with the power strengths of the reflection wave signals measured for the radar image pixels. $P_{max}$ means the maximum value of all the pixel values of the radar image, and $\alpha$ means a predetermined scalability factor.

When an adaptation threshold as per the distribution of power strengths is calculated, the radar system deletes pixel values less than the adaptation threshold from the pixel values constituting the radar image—i.e., sets them into zero—to thereby any lack of clarity of the line images.

In operation 940, the radar system applies the adaptation threshold to finally form a radar image and reads a binary code from the radar image.

Figure 10A:
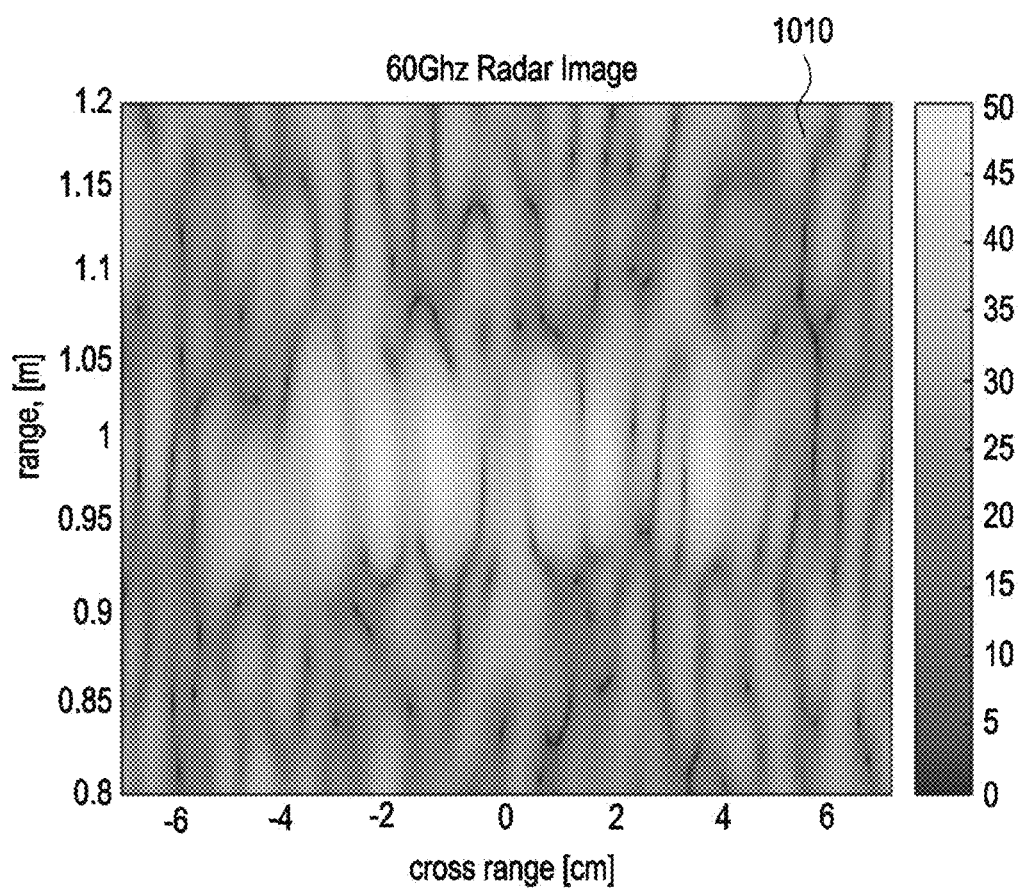
FIGS. 10A, 10B, and 10C are views illustrating a correction procedure of a radar image according to an embodiment of the present disclosure.
Figure 10B:
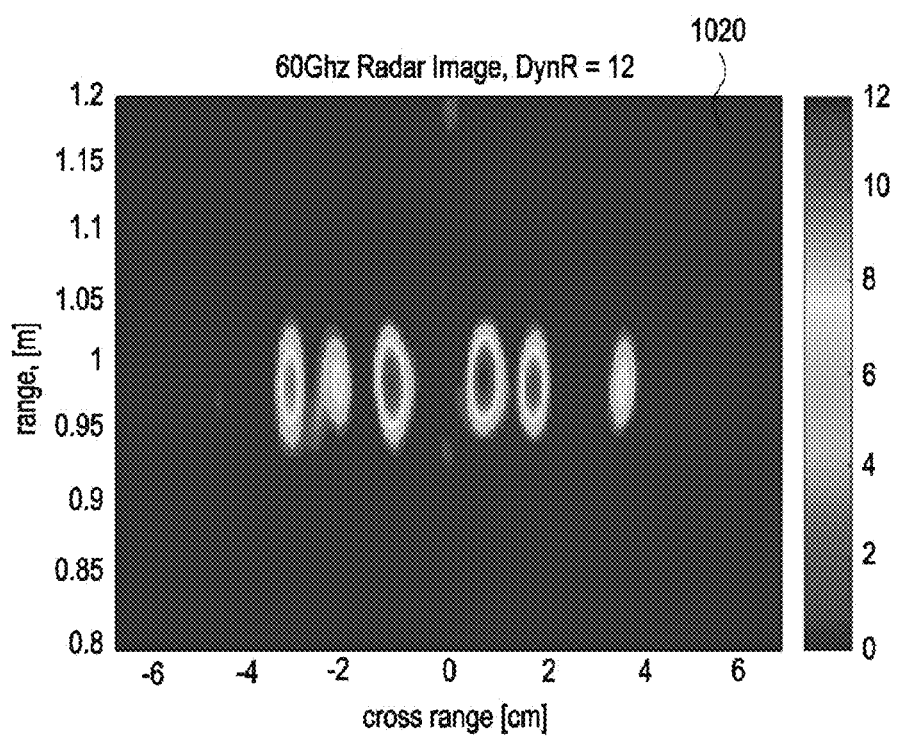
Figure 10C:
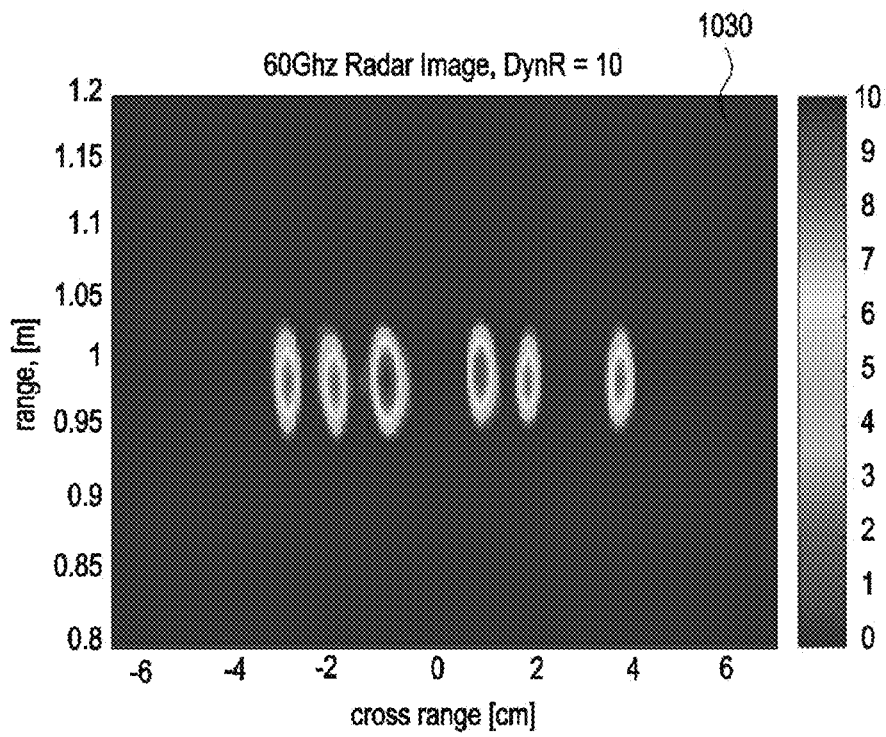

FIGS. 10A, 10B, and 10C are views illustrating a correction procedure of a radar image according to an embodiment of the present disclosure. Here, the horizontal axis means the azimuth or cross-range (the width of the conductive ID tag), and the vertical axis means the range (the length of the conductive ID tag).

Referring to FIG. 10A, a radar image 1010 is illustrated prior to the application of threshold adaptation, wherein the radar image 1010 shown is formed based on integrated values of reflection signal strengths for reflection wave signals gathered at multiple times. As shown, brief line images, although included in the radar image 1010, are unclear for their contour, rendering it difficult to precisely read out a binary code corresponding to the line images.

Referring to FIG. 10B, a radar image 1020 obtained by applying an adaptation threshold to an initial radar image 1010 is illustrated, according to an embodiment of the present disclosure, wherein the radar image 1020 contains clearer line images than the radar image 1010 of FIG. 10A.

Referring to FIG. 10C, a radar image 1030 obtained by applying both the compensation as per distance and the compensation as per antenna radiation pattern is illustrated according to an embodiment of the present disclosure. In other words, the radar image 1030 shown is one generated by applying compensation as per distance and compensation as per antenna radiation pattern to the radar image 1020 of FIG. 10B. As shown, the radar image 1030 creates line images easier to read out because the maximum power strength of each code line becomes similar, as compared with the radar image 1020 that has not gone through the compensation as per distance and compensation as per antenna radiation pattern.

Figure 11:
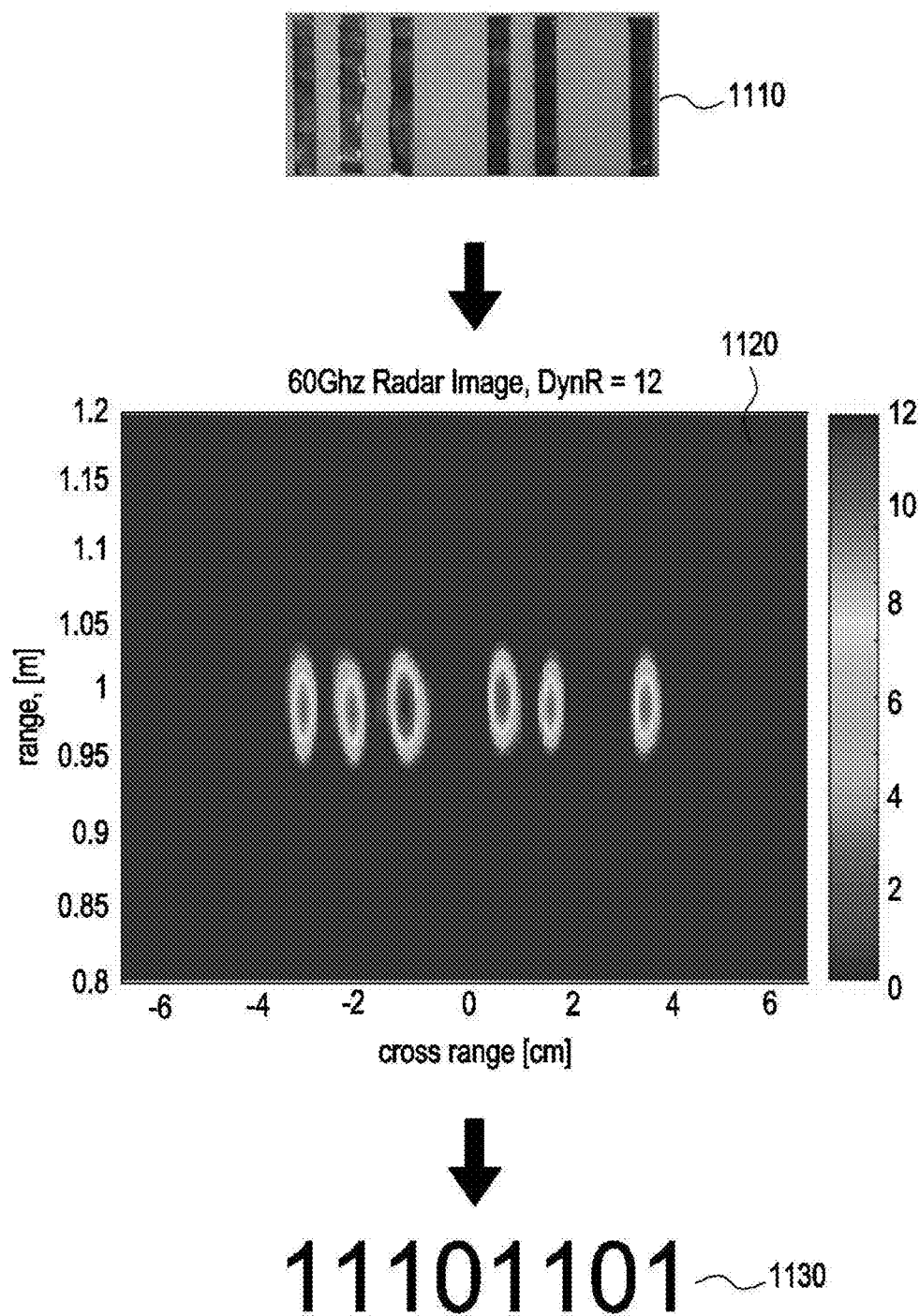
FIG. 11 is a view illustrating a procedure of reading a binary code from a compensated radar image according to an embodiment of the present disclosure.

FIG. 11 is a view illustrating a procedure of reading a binary code from a compensated radar image according to an embodiment of the present disclosure.

Referring to FIG. 11, reference number 1110 is a conductive ID tag, as a target object, constituted of line codes recorded in a conductive ink. Reference number 1120 indicates a radar image generated based on reflection wave signals for the target object. As shown, the radar image includes line images at predetermined intervals. Reference number 1130 means a binary code read out based on the radar image. The radar image determines that line positions where a line image is present in the radar image are 1's, and line positions where no line image is present are 0's. A binary code read out that way becomes "11101101" as in the example shown.

The above-described embodiments remove a substantial deterioration of detection performance of a mmWave radar system with short-range detection coverage of a few meters or less, due to a RCS distortion that arises in the radar system. In other words, the above-described embodiments propose compensation schemes capable of canceling out factors that may cause a RCS distortion, contributing to increased usability of the short-range radar system.

Particular embodiments of the present disclosure may be implemented as computer readable codes in a computer readable recording medium. The computer readable recording medium is a data storage device that may store data readable by a computer system. Examples of the computer readable recording medium may include read only memories (ROMs), random access memories (RAMs), compact disc-read only memories (CD-ROMs), magnetic tapes, floppy disks, optical data storage devices, and carrier waves (such as data transmission over the Internet). The computer readable recording medium may be distributed by computer systems over a network, and accordingly, the computer readable codes may be stored and executed in a distributed manner. Functional programs, codes, and code segments to attain various embodiments of the present disclosure may be readily interpreted by skilled programmers in the art to which the present disclosure pertains.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Accordingly, the present disclosure encompasses a program containing codes for implementing the device or method set forth in the claims of this disclosure and a machine (e.g., computer)-readable storage medium storing the program. The program may be electronically transferred via any media, such as communication signals transmitted through a wired or wireless connection and the present disclosure properly includes the equivalents thereof.

The apparatuses according to various embodiments of the present disclosure may receive the program from a program providing device wiredly or wirelessly connected thereto and store the same. The program providing apparatus may include a memory for storing a program including instructions enabling a program processing apparatus to perform a method according to an embodiment of the present disclosure and data necessary for a method according to an embodiment of the present disclosure, a communication unit for performing wired or wireless communication with a graphic processing apparatus, and a controller transmitting the program to the graphic processing apparatus automatically or as requested by the graphic processing apparatus.

While the present disclosure has been shown and described with reference to various embodiments thereof, it will be understood by those skilled in the art that various changes in form and details may be made thereto without departing from the spirit and scope of the present disclosure as defined by the appended claims and their equivalents.

What is claimed is:

1. A method for reading a code using a short-range millimeter wave (mmWave) radar, the method comprising:
    transmitting a mmWave radar signal to a target object in a radar system and receiving a reflection wave signal reflected on the target object;
    extracting reflection signal strengths for a plurality of line codes constituting the target object from the reflection wave signal;
    compensating for the reflection signal strengths based on a difference in antenna gain between the plurality of line codes as per an antenna radiation pattern of the radar system;
    forming a radar image using the compensated reflection signal strengths; and
    reading a binary code from the radar image.

2. The method of claim 1, wherein the compensating for the reflection signal strengths comprises:
    identifying a first antenna gain of a line code positioned at a center of the plurality of line codes based on the antenna radiation pattern,
    identifying a second antenna gain of a first line code of the plurality of line codes based on the antenna radiation pattern, and
    compensating for a reflection signal strength of the first line code by multiplying the reflection signal strength of the first line code by a ratio of the first antenna gain relative to the second antenna gain.

3. The method of claim 1, further comprising compensating for the reflection signal strengths or the compensated reflection signal strengths based on a difference in distance between the line codes.

4. The method of claim 1, wherein the compensating for the reflection signal strengths comprises:
    identifying a minimum distance between the radar system and the target object;
    calculating a distance between the radar system and a first line code of the plurality of line codes; and
    compensating for a reflection signal strength of the first line code by multiplying the reflection signal strength of the first line code by a ratio of the distance to the first line code relative to the minimum distance.

5. The method of claim 1, further comprising calculating times to scan the reflection wave signal, wherein the times are calculated by an equation:

$$t_k = \frac{|l_k - l_{k-1}|}{v} + t_{k-1}, \quad k = 1, 2, 3, \cdots, 2n$$

$$l_k = r \cdot \tan\left(\frac{|n-k|}{n}\cos^{-1}\left(\frac{r}{d_0}\right)\right), \quad k = 0, 1, 2, 3, \cdots, 2n$$

wherein $t_k$ denotes each time when the reflection wave signal is measured, $d_0$ denotes a distance to the target object detected at initial measurement for the reflection wave signal, v denotes a moving velocity of the target object which is detected at $t_0$, r denotes a minimum distance to the target object, and 2n+1 denotes a certain number of times of measurement.

6. The method of claim 1, further comprising calculating times to scan the reflection wave signal, wherein the times are calculated by an equation:

$$t_k = \frac{|l_k - l_{k-1}|}{v_{k-1} + (v_{k-1} - v_{k-2})/2} + t_{k-1}, \quad k = 1, 2, 3, \cdots, 2n$$

$$l_k = r \cdot \tan\left(\frac{|n-k|}{n}\cos^{-1}\left(\frac{r}{d_0}\right)\right), \quad k = 0, 1, 2, 3, \cdots, 2n$$

wherein $t_k$ denotes each time when the reflection wave signal is measured, $d_0$ denotes a distance to the target object detected at initial measurement for the reflection wave signal, $v_k$ denotes a moving velocity of the target object which is detected at $t_k$, r denotes a minimum distance to the target object, and 2n+1 denotes a certain number of times of measurement.

7. The method of claim 1, wherein the forming of the radar image comprises:
calculating a threshold for power strengths corresponding to pixels of the radar image based on a distribution of the power strengths, and
setting power strengths less than the threshold of the power strengths to 0.

8. The method of claim 7, wherein the threshold is calculated by an equation:

$$Th = P_{max} - \alpha \times E\{|P - E\{P\}|^2\}$$

wherein P is a random variable including reflection signal strengths corresponding to the pixels of the radar image, $P_{max}$ denotes a maximum value of all pixel values of the radar image, and α denotes a certain scalability factor.

9. A radar system reading a code using a short-range millimeter wave (mmWave) radar, the radar system comprising:
a transceiver configured to:
transmit a mmWave radar signal to a target object, and
receive a reflection wave signal reflected on the target object; and
a processor configured to:
extract reflection signal strengths for a plurality of line codes constituting the target object from the reflection wave signal,
compensate for the reflection signal strengths based on a difference in antenna gain between the plurality of line codes as per an antenna radiation pattern of the radar system,
form a radar image using the compensated reflection signal strengths, and
read a binary code from the radar image.

10. The radar system of claim 9, wherein the processor is further configured to:
identify a first antenna gain of a line code positioned at a center of the plurality of line codes based on the antenna radiation pattern,
identify a second antenna gain of a first line code of the plurality of line codes based on the antenna radiation pattern, and
compensate for a reflection signal strength of the first line code by multiplying the reflection signal strength of the first line code by a ratio of the first antenna gain relative to the second antenna gain.

11. The radar system of claim 9, wherein the processor is further configured to compensate for the reflection signal strengths or the compensated reflection signal strengths based on a difference in distance between the line codes.

12. The radar system of claim 9, wherein the processor is further configured to:
identify a minimum distance between the radar system and the target object,
calculate a distance between the radar system and a first line code of the plurality of line codes, and
compensate for a reflection signal strength of the first line code by multiplying the reflection signal strength of the first line code by a ratio of the distance to the first line code relative to the minimum distance.

13. The radar system of claim 9, wherein the processor is further configured to calculate times to scan the reflection wave signal by an equation:

$$t_k = \frac{|l_k - l_{k-1}|}{v} + t_{k-1}, \quad k = 1, 2, 3, \cdots, 2n$$

$$l_k = r \cdot \tan\left(\frac{|n-k|}{n}\cos^{-1}\left(\frac{r}{d_0}\right)\right), \quad k = 0, 1, 2, 3, \cdots, 2n$$

wherein $t_k$ denotes each time when the reflection wave signal is measured, $d_0$ denotes a distance to the target object detected at initial measurement for the reflection wave signal, v denotes a moving velocity of the target object which is detected at $t_0$, r denotes a minimum distance to the target object, and 2n+1 denotes a certain number of times of measurement.

14. The radar system of claim 9, wherein the processor is further configured to calculate times to scan the reflection wave signal by an equation:

$$t_k = \frac{|l_k - l_{k-1}|}{v_{k-1} + (v_{k-1} - v_{k-2})/2} + t_{k-1}, \quad k = 1, 2, 3, \cdots, 2n$$

$$l_k = r \cdot \tan\left(\frac{|n-k|}{n}\cos^{-1}\left(\frac{r}{d_0}\right)\right), \quad k = 0, 1, 2, 3, \cdots, 2n$$

wherein $t_k$ denotes each time when the reflection wave signal is measured, $d_0$ denotes a distance to the target object detected at initial measurement for the reflection wave signal, $v_k$ denotes a moving velocity of the target object which is detected at $t_k$, r denotes a minimum distance to the target object, and 2n+1 denotes a certain number of times of measurement.

15. The radar system of claim 9, wherein the processor is further configured to:
calculate a threshold for power strengths corresponding to pixels of the radar image based on a distribution of the power strengths, and
set power strengths less than the threshold of the power strengths to 0.

16. The radar system of claim 15, wherein the threshold is calculated by an equation:

$$Th = P_{max} - \alpha \times E\{|P - E\{P\}|^2\}$$

wherein P is a random variable including reflection signal strengths corresponding to the pixels of the radar image, $P_{max}$ denotes a maximum value of all pixel values of the radar image, and α denotes a certain scalability factor.

* * * * *